INVENTOR
ROBERT G. LANDRY
GORDON C. ADAMS
BY Semmes and Semmes
ATTORNEYS

INVENTOR
ROBERT G. LANDRY
GORDON C. ADAMS
BY *Semmes and Semmes*

ATTORNEYS

Aug. 4, 1970   R. G. LANDRY ET AL   3,522,870
ROTARY ACTUATOR

Filed Aug. 13, 1968   3 Sheets-Sheet 3

INVENTOR
ROBERT G. LANDRY
GORDON C. ADAMS

BY Semmes and Semmes

ATTORNEYS

United States Patent Office 3,522,870
Patented Aug. 4, 1970

3,522,870
ROTARY ACTUATOR
Robert G. Landry, Lewiston, and Gordon C. Adams, Auburn, Maine, assignors to Diamond Machinery Company, Lewiston, Maine, a corporation of Maine
Filed Aug. 13, 1968, Ser. No. 752,396
Int. Cl. B65g 47/00; F16h 27/02, 29/02
U.S. Cl. 198—20
8 Claims

ABSTRACT OF THE DISCLOSURE

Rotary actuator arm, an apparatus for translating linearly advancing air into rotary movement of a deflecting arm or the like, particularly a device for actuating a rotary deflecting arm in a conveyor system.

BACKGROUND OF THE INVENTION

Field of the invention

In contemporary conveyor systems various types of pivotable deflector arms are used to pivot in a horizontal plane from a position of rest at one side of the conveyor to a deflecting position diagonally across the conveyor line. In the diagonal, deflecting position the deflector arm diverts packages, boxes or the like being advanced upon the conveyor to a side platform or bin. Conventionally, electromagnetic means, such as a solenoid, are used to pivot the arm laterally across the conveyor and, as the electromagnetic means is de-energized, a tension spring may return pivot the deflector arm to its position of rest parallel and to one side of the conveyor.

A principal shortcoming of such devices is the extreme abruptness of pivoting movement both to the diagonal deflecting position and to the return position, occasioned by the instantaneous reaction to the electromagnetic forces. Also, the solenoids are expensive to manufacture and subject to breakdown and the tension springs are subject to fatigue.

Description of the prior art

Fitzgerald et al. (3,276,563):

Typical of the prior art wherein a solenoid is used to activate the deflector arm to a deflecting position and a tension spring is used both as a damping mechanism and as a means for returning the arm to its position of rest. Relatively heavy loads cannot be handled, of course, by the solenoid means.

SUMMARY OF THE INVENTION

According to the present invention, compressed air is directed through a housing having air inlet and air outlet conduits. A rotary shaft having a spiral groove exterior is positioned in the housing so that an inner end communicates with the air inlet port and the outer end extends above the housing for support of a laterally pivotable actuator arm. A compression spring 36 may be interposed intermediate the inner end of the shaft 25 and the air inlet conduit 30 and ball bearings 10 may be supported in the housing so as to engage the exterior spiral grooves 63 and 64. As air flows through the inlet conduit, shaft 25 is vertically raised against the compression spring 36, spiral grooves 63 and 64 inducing lateral rotation of the shaft and consequent pivoting of the deflector arm.

As the air is bled through the outlet conduit, compression spring 36 return pivots the shaft to its position of rest. Various electrical contact means may be used to signal by pilot lamps both the pivoting actuation of the arm to its deflecting position and its return pivoting to normal position upon bleeding of air through the outlet conduit.

DESCRIPTION OF THE PREFERRED EMBODIMENTS

Figure 1:
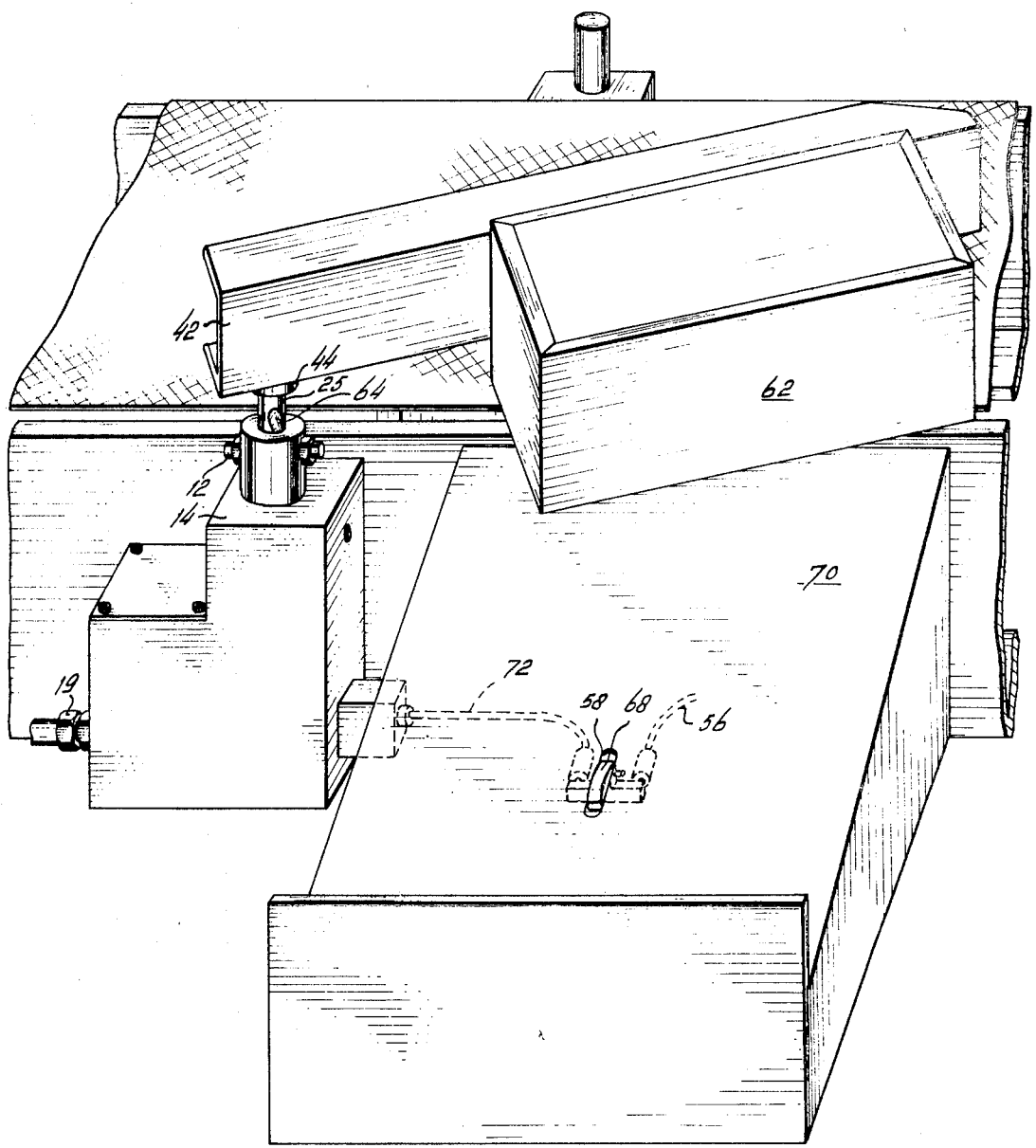
FIG. 1 is a perspective view of the device.
Figure 2:
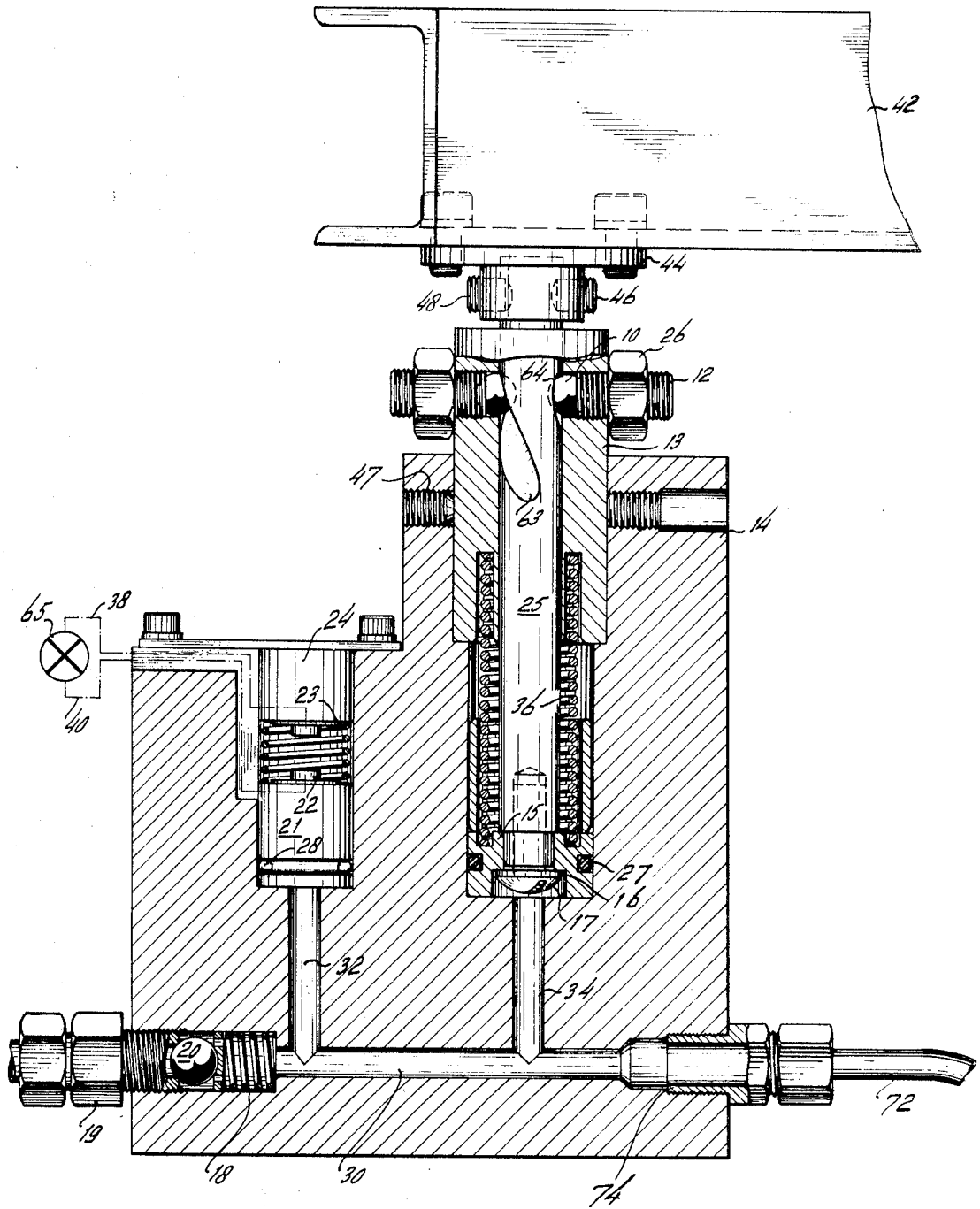
FIG. 2 is a vertical section thereof.
Figure 3:
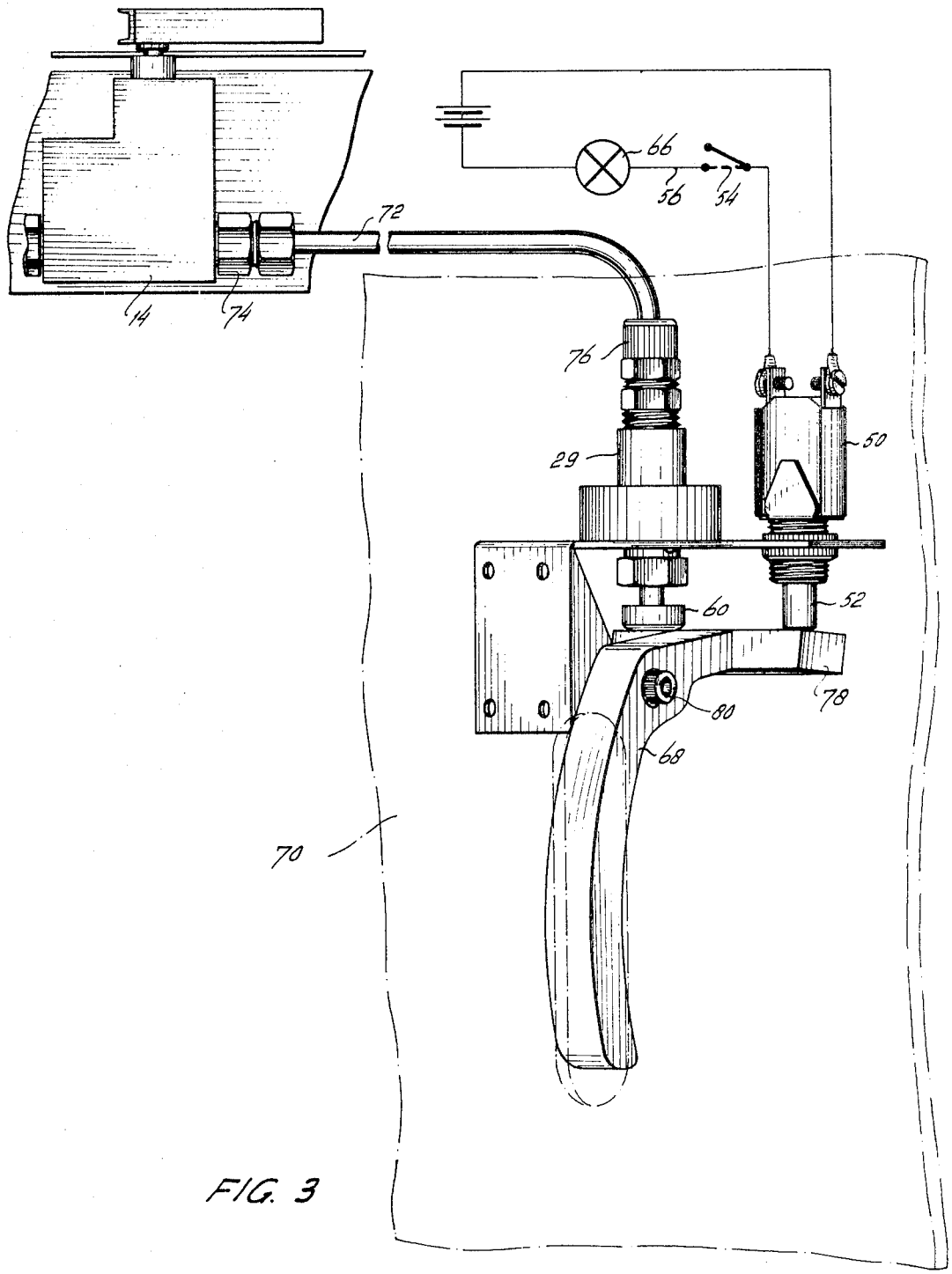
FIG. 3 is a schematic, bottom plan view of the platform 70 switching mechanism 68 with its connection to bleeding valve 29 and pilot lamp 66.

In FIGS. 1 and 2 a laterally pivotable deflecting arm 42 is illustrated as positioned upon the outside end of rotary shaft 25 by means of a collar 44 having set screws or the like 46 and 48 extending into the spiral shaft. A pair of identical ball bearings 10 may be supported in a spiral shaft holder 13 by set screws 47 extending into control block or housing 14. Shaft holder 13 may be adjustably oriented by set screws 47 so that the diverter arm 42, pivoting approximately 30°, may rest parallely with the conveyor. Ball bearings 10 are urged by set screws 12 extending through nuts 26 to engage the spiral grooves 63 and 64 in shaft 25. At the inner end of the shaft 25 piston 15 may be secured thereto by means of roundhead screw 17 which extends through piston 15 and washer 16. An O-ring seal 27 may be supported adjacent piston 15 so as to effect vertical extension of piston 15 and shaft 25 as air flows through inlet conduit 30.

Air enters inlet conduit 30 via threaded bushing 19, travels around sealing ball 20 urged to a sealing position by means of compression spring 18. Air is exhausted via exit conduit 72 bleeding valve 29, which in FIG. 2 is shown in its exhaust or venting position. This exhaust may be actuated exteriorly by a curved switching lever 68 pivoted as at 80 in the top of receiving platform 70 so that a medial curved portion extends through aperture 58. Valve 29 is connected to conduit 30 via hose 72 and hose end fittings 74 and 76. As air enters conduit 30 exhaust valve 29 in its closed position, head 60 abuts shoulder 78 of lever 68 thereby sealing air in the passage and urging piston 15 and shaft 25 vertically, causing the rotary movement desired. Simultaneously, air travels through signal conduit 32 compressing signalling piston 21 against contact holder top 24, identical contacts 22 closing against the action of compression spring 23. As contacts 22 close, pilot lamp 65 is energized via wires 38 and 40, to signal that the arm 42 is being laterally pivoted.

As diverting arm 42 engages package 62, as illustrated in FIG. 1, package 62 slides into platform 7, depressing switching lever 68. Lever 68 while being depressed is pivoted at 80 so that its shoulder 78 closes with bleeding valve head 60 and microswitch 50 depressible element 52. Consequently valve 29 is opened to bleed air, permitting return of the rotary actuator to the position illustrated in FIG. 2, so that arm 42 rests parallely with the conveyor. Simultaneously, microswitch 50 opens circuit 56 to deactivate station call lamp 66. Circuit 56 may be turned "on" or "off" by switch 54.

Manifestly, variously configured air conduits may be employed for translating lineal air movement to a rotary actuating movement without departing from the spirit and scope of invention, as defined in the claims.

What is claimed is:

1. A rotary actuator of the type driven by air in combination with an advancing conveyor and an article receiving side platform, comprising:
    (A) a housing having an air inlet conduit and an air outlet conduit each including valve means;
    (B) a rotary shaft having a spiral groove exterior, rotatably supported in said housing, one end of said shaft communicating with said air inlet conduit so as to be vertically extensible upon flow of air through said inlet conduit and the other end of said shaft extending outside of said housing; said shaft including an air sealing and a compression spring means interposed between the end of said shaft in said housing and said air inlet conduit;

(C) a rotary actuator arm secured to said rotary shaft outside of said housing and extending laterally thereof for pivoting across said conveyor so as to engage and divert an article being advanced upon said conveyor as air is fed through said inlet conduit; and (D) a switching lever pivotably supported in said article receiving platform in juxtaposition with said valve means in said air outlet conduit, so as to bleed open said outlet conduit as an article is diverted from said conveyor onto said platform.

2. A rotary actuator in combination with an advancing conveyor and an article receiving platform as in claim 1, including a signal conduit communicating with said air inlet conduit and having a compressible signalling piston actuable towards a closing electrical contact and a pilot lamp so that air flowing through said air inlet passage urges said signallng piston against said contact, activating said pilot lamp, as said actuator arm is pivoted.

3. A rotary actuator in combination with an advancing conveyor and an article receiving platform as in claim 2, said air inlet passage having a ball check valve with set screw adjustment, so as to vary the amount of flowing air required to open said valve.

4. A rotary actuator in combination with an advancing conveyor and an article receiving platform as in claim 3, including a call light circuit supported adjacent said switching lever, so that pivoting of said lever upon diverting of an article to said platform de-energizes said call light.

5. A rotary actuator in combination with an advancing coveyor and an article receiving platform as in claim 4, said rotary shaft end communicating with said air inlet passage via an actuating chamber in said housing and including:

(A) a compression spring fitted peripherally over a segment of said shaft and seated in said chamber;

(B) an air piston secured to the shaft in overlying abutment with said compression spring; and (C) a sealing ring secured peripherally of said shaft in contact with the walls of said chamber intermediate said piston and said air inlet conduit, so as to seal off air, as said shaft is vertically extended by air contacting said piston.

6. A rotary actuator in combination with an advancing conveyor and an article receiving platform as in claim 5, said shaft having parallel spiral grooves, each spiral groove being independently engaged by a ball bearing supported in said housing.

7. A rotary actuator in combination with an advancing conveyor and an article receiving platform as in claim 6, said air outlet conduit valve being of the bleeder type and supported adjacently to said station call light circuit so that pivoting of said switching lever upon diverting of an article to said receiving platform, simultaneously bleeds said outlet conduit and de-energizes said station call light.

8. A rotary actuator in combination with an advancing conveyor and an article receiving platform as in claim 7, said station call light circuit including an independent on-off circuit breaking switch.

References Cited
UNITED STATES PATENTS 2,743,618   5/1956   Watson _____ 74—89 X EDWARD A. SROKA, Primary Examiner U.S. Cl. X.R.

198—188